UNITED STATES PATENT OFFICE.

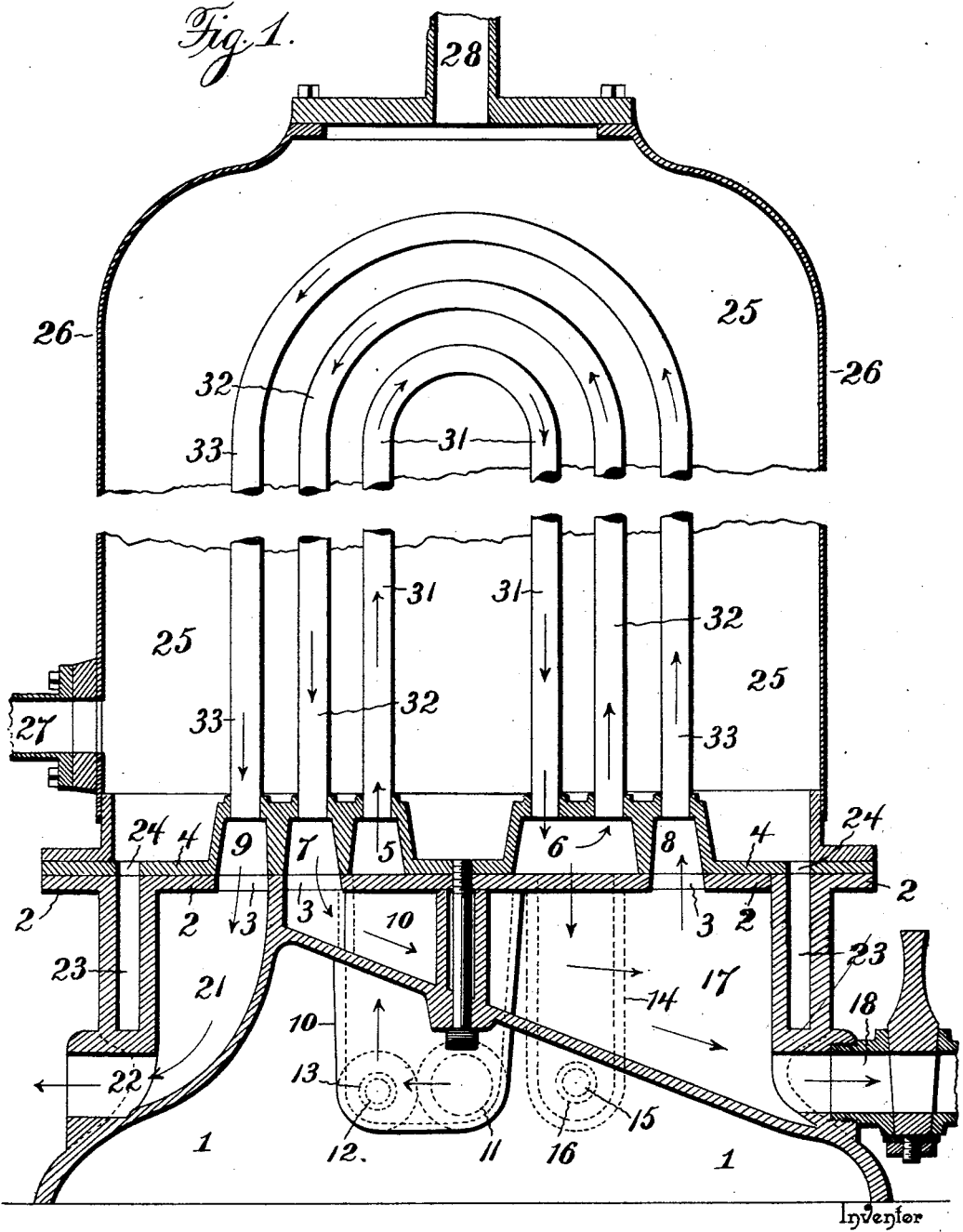

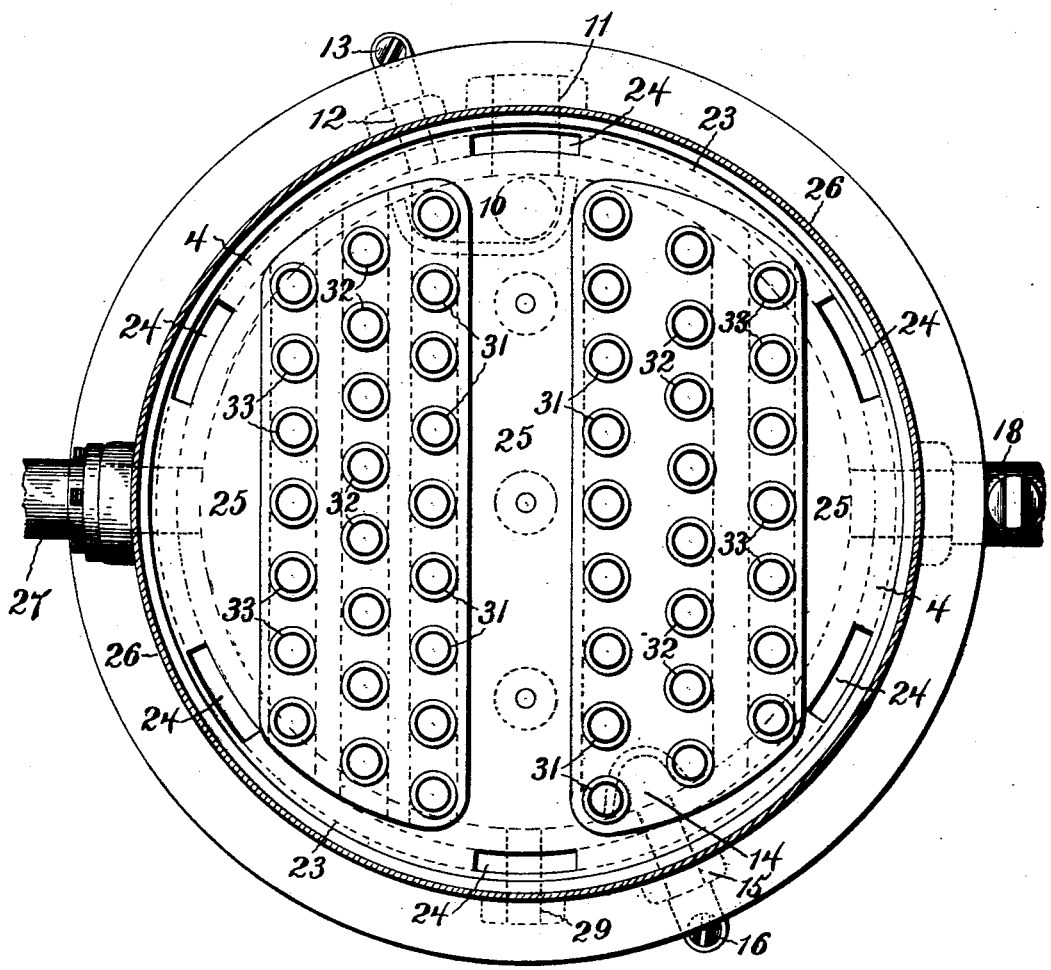

BENJAMIN F. KELLEY, OF BROOKLYN, NEW YORK.

FEED-WATER HEATER AND PURIFIER.

SPECIFICATION forming part of Letters Patent No. 586,498, dated July 13, 1897.

Application filed March 13, 1897. Serial No. 627,308. (No model.)

*To all whom it may concern:*

Be it known that I, BENJAMIN F. KELLEY, a citizen of the United States, residing at Brooklyn, in the county of Kings and State of New York, have invented new and useful Improvements in Feed-Water Heaters and Purifiers, of which the following is a specification.

This invention relates to an improved construction and arrangement of the parts of a feed-water heater and purifier, and has for a special object to provide suitable cocks that will permit convenient and thorough emptying of the water tubes, channels, and chambers of a water-tube feed-water heater and purifier, so that there will be no liability to freezing and consequent damage to the heater when not in operation.

It is another object of my invention to provide a steam-jacket surrounding the settling-chamber of a feed-water heater and purifier, so that the temperature of the partially-heated feed-water will be increased after deposit of its impurities and after it has been already heated by passage through a series of water-tubes inclosed in a steam-chamber.

Other purposes and advantages of the invention will hereinafter appear in the construction and combination of feed-water heating and purifying devices, as described with reference to the annexed drawings, in which—

Figure 1 is a sectional elevation of my improved water-tube feed-water heater and purifier. Fig. 2 is a horizontal section of the same above the base.

Referring to the drawings, the numeral 1 designates the base portion of the feed-water heater and purifier. The base 1 is provided with a flat top 2, having perforations 3 therein at suitable points, as shown, for a purpose hereinafter explained. On the top of the base 1 there is placed horizontally a tube-sheet 4, portions of which are elevated to form a series of parallel-arranged water-channels 5, 6, 7, 8, and 9, as shown.

The water-channel 5 communicates at one end with a depending water-inlet chamber 10, that is located in one side of the base. This chamber 10 is provided with a feed-water inlet 11 and with a drip-outlet 12, having a drainage-cock 13 connected therewith.

Below one end of the water-channel 6 and communicating therewith is a depending water-chamber 14, with which a drip-outlet 15 and drainage-cock 16 are connected.

The bottom of the water-channel 7 communicates through a series of the openings 3 with one end of a settling-chamber 17, having a bottom that is preferably inclined away from beneath said water-channel. At its lowest part the settling-chamber 17 is provided with a blow-off cock 18, located at one side of the base. Above its deeper part the settling-chamber 17 is in communication through a series of the openings 3 with the water-channel 8 for admission of purified water into said channel.

The water-channel 9 empties through a series of the openings 3 into a water-outlet chamber 21, having an outlet-passage 22 for the hot and purified feed-water.

There is provided in the base 1 an annular steam-jacket 23, surrounding the settling-chamber 17, water-chambers 10 14, and hot-water-outlet chamber 21, as shown. The top of this steam-jacket 23 communicates through an annular series of ports 24 with the steam space or chamber 25, which is inclosed by a cylindrical or somewhat dome-shaped shell 26, that constitutes the upper part of the feed-water heater. The shell 26 is secured to the tube-sheet 4 and top of the base 1 in any suitable or approved manner. A steam-inlet 27 is provided, preferably in one side of the shell 26, and a steam-outlet 28, preferably at the top. To permit the ready removal of oil and water of condensation from the steam-jacket 23 and upper steam space or chamber 25, there is a drip-outlet 29 at the lower part of the steam-jacket.

Within the steam-space 25, inclosed by the shell 26, there are placed a number of arched water-tubes 31, 32, and 33, arranged in several sets, to connect the several parallel-arranged and horizontal water-channels 5, 6, 7, 8, and 9, as shown. These water-tubes are preferably made from seamless drawn brass and have their ends expanded into suitable apertures in the tops of the several horizontally-arranged water-channels of the tube-sheet.

By reference to the arrows in Fig. 1 it will be seen that the feed-water enters through the inlet 11 into the chamber 10 and thence passes into one end of the water-channel 5, along which it will flow. When this channel 5 is filled, the water will rise through all the connected water-tubes 31 and pass thence into and along the water-channel 6 and from one end thereof into the chamber 14, while the main current will rise through the water-tubes 32 and pass thence through the water-channel 7 and into the settling-chamber 17, where the heated water will deposit its mineral matter and other impurities. From the settling-chamber 17 the purified water ascends to the water-channel 8 and into the water-tubes 33, where it is further heated by the steam in the surrounding chamber. These water-tubes 33 conduct the hot feed-water into the water-channel 9, whence it passes through the outlet-chamber 21 to the boiler or elsewhere, as required. In the steam-jacketed settling-chamber 17 the temperature of the feed-water is increased beyond that received in its passage through the water-tubes 31 32 and connecting water-channels 5, 6, and 7. The impurities are precipitated, and thus the feed-water is delivered to the boiler free from scale-producing substances. The water-channel 5 delivers water to all the tubes 31 simultaneously. These tubes 31 discharge into the channel 6, which also communicates directly with the tubes 32, all of which receive water simultaneously from said channel. From the tubes 32 the partly-heated feed-water passes through channel 7 into the settling-chamber 17, where the impurities are precipitated and the water is still further heated by reason of the steam-jacket 23, that surrounds said settling-chamber. Passing now through the channel 8 into all the tubes 33 at once the water is still further heated by the steam in the surrounding chamber 25 and then passes through the channel 9 into the hot-water-outlet chamber 21 and thence to the boiler. In its passage through the steam-surrounded water-tubes 31 and 32 the feed-water attains a high degree of heat, which is favorable to the precipitation of mineral substances and other impurities.

The feed-water heater may be built in various sizes, determined by the special purpose for which it may be required, and while the drawings show three sets of water heating and circulating tubes 31, 32, and 33 I would have it understood that there may be instead but two sets, or four or more, with but slight differences in construction of the heater.

The openings 3 are provided in series throughout the length of the horizontal and parallel water-channels 7, 8, and 9, but the channels 5 and 6 each have only one such bottom opening located near one end for communication with the cold-water chambers 10 and 14, respectively.

The impurities deposited in the steam-jacketed settling-chamber 17 may be blown off through the cock 18 from time to time, as required, leaving only the purified water to continue its circulation through the tubes 33 of the heater.

Through the drip-outlet 29 oil and condensed steam may be discharged from the steam-jacket 23 and communicating steam-chamber 25 whenever necessary.

The water-chambers 10 14 and settling-chamber 17 being furnished with drainage-cocks 13, 16, and 18, respectively, there is ample provision for drawing off all the water in the apparatus whenever desired, and thus there need be no liability to freezing when the heater is not in use, for by opening the several cocks the heater can be quickly and thoroughly emptied.

What I claim as my invention is—

1. In a feed-water heater and purifier, the combination of the base inclosing the water-chambers 10 and 14, settling-chamber 17 and hot-water-outlet chamber 21; the tube-sheet 4 provided with elevated parallel and horizontally-arranged water-channels communicating with the said chambers in the base; the arched water-tubes connecting the said water-channels; the steam-jacket 23 surrounding said base and its inclosed chambers; the steam-chamber 25; discharge-cocks 13 and 16 for the chambers 10 and 14, respectively; and a blow-off cock 18 for the settling-chamber 17, said cocks being arranged to permit thorough emptying of the water tubes, channels and chambers, substantially as described.

2. In a feed-water heater and purifier, the combination of the base 1 inclosing the settling-chamber 17 and hot-water-outlet chamber 21, the said base being provided with a top having perforations 3, as described; the tube-sheet 4 provided with elevated parallel and horizontally-arranged water-channels; the arched water-tubes arranged in sets and connecting said water-channels; the steam-jacket 23 surrounding the base and its inclosed chambers; and the steam-chamber 25 surrounding the water-tubes and communicating with the said steam-jacket of the base, substantially as described.

3. In a feed-water heater and purifier, the combination of a steam-jacketed base inclosing the cold-water chambers 10 and 14, settling-chamber 17 and hot-water-outlet chamber 21; the tube-sheet 4 provided with parallel horizontally-arranged water-channels 5, 6, 7, 8 and 9 having passages communicating with the inclosed chambers of the base, as described; the arched water-tubes 31, 32 and 33 communicating with said water-channels; the steam-chamber 25 inclosing the said water-tubes and communicating with the steam-jacket of the base, through ports 24; and cocks to drain the several chambers and tubes of the heater, substantially as described.

4. In a feed-water heater and purifier, the combination of the base 1 provided with steam-jacket 23 and inclosing the cold-water chambers 10, 14 settling-chamber 17 and hot-water-outlet chamber 21; the tube-sheet 4 provided with the elevated water-channels 5, 6, 7, 8 and 9; the arched water-tubes 31, 32 and 33 connecting said water-channels; the steam-chamber 25 surrounding said water-tubes and communicating with the steam-jacket 23; and drainage or blow-off cocks for emptying the tubes and chambers, substantially as described.

In testimony whereof I have hereunto set my hand in presence of two subscribing witnesses.

BENJAMIN F. KELLEY.

Witnesses:
SIMON KEIT,
H. D. CHRISTOFFERS.